No. 759,559. PATENTED MAY 10, 1904.
R. D. SCOTT.
RUNNING GEAR FOR POWER DRIVEN VEHICLES.
APPLICATION FILED JULY 20, 1903.
NO MODEL.
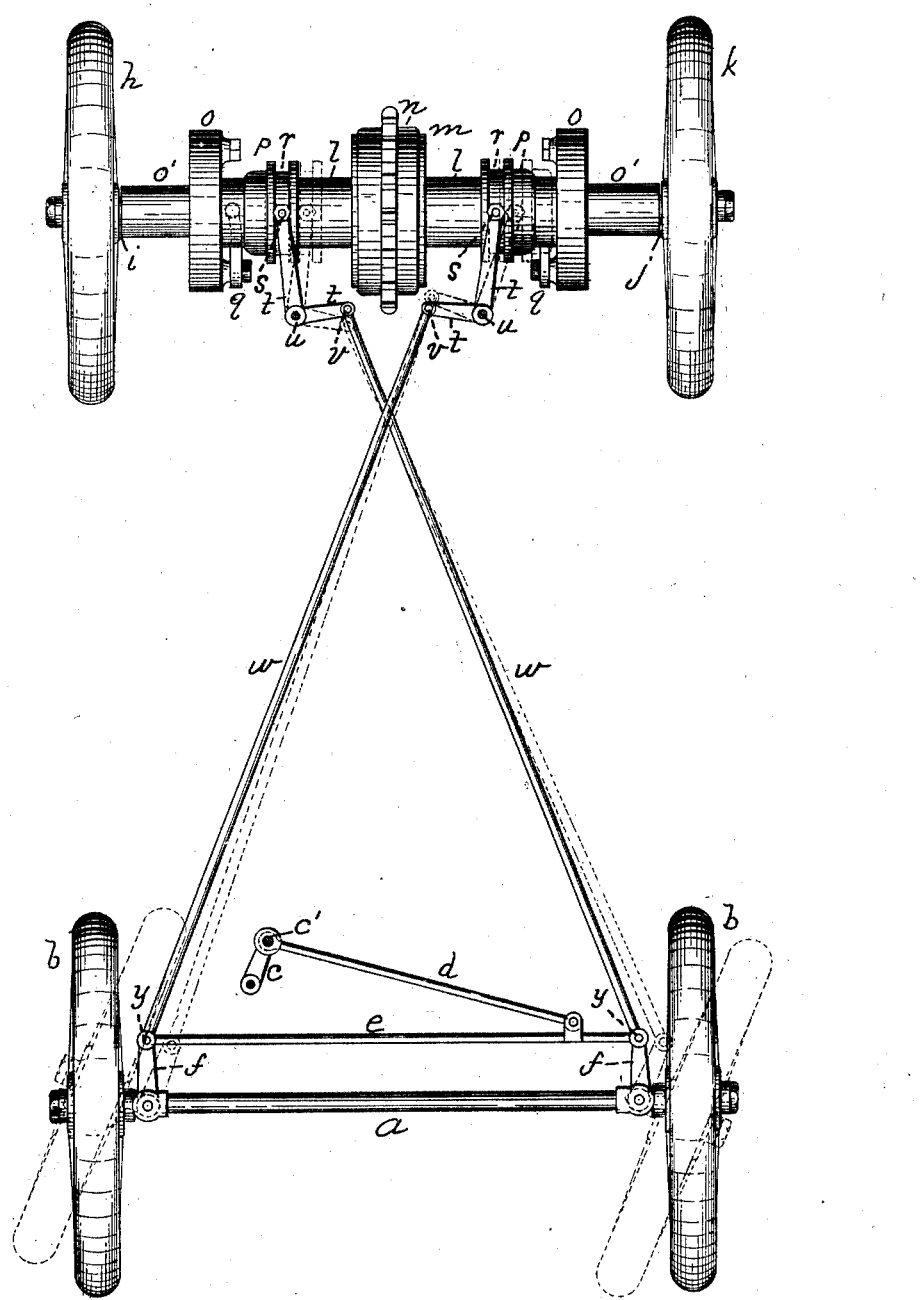

No. 759,559. Patented May 10, 1904.

UNITED STATES PATENT OFFICE.

RUFUS D. SCOTT, OF BEVERLY, MASSACHUSETTS, ASSIGNOR TO ALBERT G. ROPES, OF MORRISTOWN, NEW JERSEY.

RUNNING-GEAR FOR POWER-DRIVEN VEHICLES.

SPECIFICATION forming part of Letters Patent No. 759,559, dated May 10, 1904.

Application filed July 20, 1903. Serial No. 166,278. (No model.)

*To all whom it may concern:*

Be it known that I, RUFUS D. SCOTT, a citizen of the United States, residing in Beverly, in the county of Essex and State of Massachusetts, have invented a new and useful Improvement in the Running-Gear for Power-Driven Vehicles, of which the following is a specification.

This invention relates to mechanism intermediate of the front wheels or the steering mechanism thereon and the rear or driving axle, whereby when the front axle and wheels are turned by the steering apparatus to the right or to the left, as is the case when an automobile is going around a curve, the wheel on the rear axle which is on the outer side is held into engagement with said axle and drives the machine, while the wheel on the rear axle which is on the inner side in going around a curve is placed out of engagement and does not aid in driving the machine, the said operation being accomplished automatically or wholly by means of said connection between the front wheels and the rear axle. In other words, when the operator moves his lever to turn the course of the vehicle the outer rear wheel is held into and the inner rear wheel placed out of engagement with the power by the mere movement of the steering-lever.

The nature of the invention is fully described below and illustrated in the accompanying drawing, which shows a view in plan of enough of the running-gear of an automobile to illustrate my invention.

$a$ represents the front axle, provided in the ordinary manner with wheels $b$, which are not, of course, driving-wheels.

$c$ is the steering-lever, pivoted in the ordinary manner at $c'$ to the vehicle and connected by the bar $d$ with the horizontal rod $e$, which by means of the cranks $f$ (which directly connect with the wheels) turns the front wheels to the right or to the left and steers the vehicle, all as is now common.

$h$ and $k$ are the rear wheels, rigid on a divided rear axle—that is, an axle made in two parts $i$ $j$ and inclosed in sleeves $l$, whose inner ends are formed up at $m$ and inclose the inner ends of the shafts $i$ $j$ and are connected by a peripheral gear $n$, which communicates with the power. The divided shaft and the parts $l$ $m$ $n$ are not new in this invention and need no further description. Keyed to each shaft is the hub $o'$ of the member $o$ of a friction-clutch, whose other member is integral with the adjacent sleeve $l$, on which slides a cone $p$, which is adapted to operate a spreader $q$ and bring the two portions of the clutch together into engagement in the ordinary manner, there being no novelty in this invention in the clutches or cones, which may be of any suitable construction. Into the annular groove $r$ on each cone there extends a finger $s$, which is secured to the outer end of a bell-crank $t$, pivoted at $u$ to the stationary portion of the vehicle, and the other end of the lever is pivotally connected at $v$ to the rear end of the rod $w$, whose forward end is pivotally connected at $y$ to the bell-crank $f$, which is on the opposite side of the vehicle from the said cone. In other words, the cone on the left side is connected with the front wheel on the right side and the cone on the right side with the front wheel on the left side, the rods $w$ crossing for the purpose.

In practical operation when the gear is in the position indicated by full lines in the drawing, and hence the vehicle is running in a straight line, both of the clutches are in engagement with the rear axle and both of the rear wheels $h$ and $k$ are driving the vehicle. Should the front wheels $b$ $b$ be turned into the position indicated by dotted lines for the purpose of driving the vehicle around a curve to the right, the lever $f$, which is connected with the left forward wheel, pulls on the rod $w$, which is connected with the bell-crank $t$ and clutch $p$ on the portion of the shaft which supports the right rear wheel $h$, separating the two portions of the clutch in the ordinary manner and releasing said wheel $h$ from the power and allowing it to simply roll over the road-bed on the inner side of the curve. At the same time the rod $w$, which connects the right front wheel $b$ with the clutch which is next the left rear wheel $k$, holds the two portions of said clutch in engagement, and hence the said wheel $k$ is a driving-wheel and is the only driving-wheel as it travels around the curve on the outer side. If the vehicle is turned to the left, the operation is reversed, and the right rear wheel $h$ becomes a driving-wheel, while the left wheel $k$ is the idle wheel. Thus it will be seen that when the operator turns his steering-lever to drive the vehicle around a curve the outside rear wheel becomes immediately the driving-wheel, while the inside rear wheel simply rolls over the surface of the road-bed, and this is done practically automatically.

Having thus fully described my invention, what I claim, and desire to secure by Letters Patent, is—

1. In a running-gear for power-driven vehicles, a driving-axle and wheels adapted to be driven thereby; mechanisms intermediate of each said wheel and said axle for transmitting motion from the axle to each wheel independently of the other; a steering mechanism under control of the operator; and mechanism intermediate of and actuated by the steering mechanism and the mechanisms for transmitting power from the driving-axle to the driving-wheels, whereby when the vehicle is steered to right or left the driving-wheel on the outer surface of the curve operates as a driver while the driving-wheel on the inner sides of the curve does not so operate.

2. In a running-gear for power-driven vehicles, a divided driving-axle; a clutch on each part of the axle; a wheel on each part of the axle adapted to receive motion therefrom by means of said clutches; a pair of suitably-supported running wheels; a steering mechanism connected with said running wheels; and mechanism intermediate of the steering mechanism next each running wheel and the clutch mechanism next each driving-wheel on the opposite side of the vehicle, whereby both clutch mechanisms are held in engagement with their driving-wheels when the vehicle is steered in a straight line, but when it is steered in a curved line the clutch mechanism next the driving-wheel on the inside of the curve is moved out of engagement therewith.

3. In a running-gear for power-driven vehicles, the divided driving-shaft $i$ $j$ provided with the wheels $h$ $k$; a clutch mechanism on each portion of said shaft adapted to transmit motion therefrom to the wheel thereon; the front running wheels $b$; the steering mechanism $f$ $e$ connected therewith; and the crossed rods $w$ each extending from the steering mechanism next one front wheel and connected at its opposite end with the clutch acting on the rear driving-wheel on the opposite side of the vehicle, substantially as and for the purpose set forth.

In testimony whereof I have signed my name to this specification in the presence of two subscribing witnesses.

RUFUS D. SCOTT.

Witnesses:
BENJAMIN B. MURRAY,
EDWARD ELDRED.